(12) United States Patent
Schlam

(10) Patent No.: US 11,210,972 B1
(45) Date of Patent: Dec. 28, 2021

(54) OPTICAL SHUTTER AND DISPLAY PANEL

(71) Applicant: New Visual Media Group, L.L.C., Eatontown, NJ (US)

(72) Inventor: Elliott Schlam, Wayside, NJ (US)

(73) Assignee: New Visual Media Group, L.L.C., Eatontown, NJ (US)

( * ) Notice: Subject to any disclaimer, the term of this patent is extended or adjusted under 35 U.S.C. 154(b) by 0 days.

(21) Appl. No.: 17/132,052

(22) Filed: Dec. 23, 2020

(51) Int. Cl.
| | |
|---|---|
| *G09F 9/37* | (2006.01) |
| *G06F 1/16* | (2006.01) |
| *G09G 3/34* | (2006.01) |
| *F21V 14/08* | (2006.01) |
| *F21V 14/00* | (2018.01) |

(52) U.S. Cl.
CPC ............ *G09F 9/372* (2013.01); *G06F 1/1609* (2013.01); *G09G 3/3433* (2013.01); *F21V 14/006* (2013.01); *F21V 14/08* (2013.01); *G09G 2300/026* (2013.01)

(58) Field of Classification Search
CPC ...... G09G 3/3433; G09F 9/372; G06F 1/1609
See application file for complete search history.

(56) References Cited

U.S. PATENT DOCUMENTS

| | | |
|---|---|---|
| 3,236,290 A | 2/1966 | Lueder |
| 3,897,997 A | 8/1975 | Kalt |
| 3,989,357 A | 11/1976 | Kalt |
| 4,082,426 A | 4/1978 | Brown |
| 4,094,590 A | 6/1978 | Kalt |
| 4,105,294 A | 8/1978 | Peck |
| 4,208,103 A | 6/1980 | Kalt et al. |
| 4,248,501 A | 2/1981 | Simpson |
| 4,266,339 A | 5/1981 | Kalt |
| 4,336,536 A | 6/1982 | Kalt et al. |
| 4,383,255 A | 5/1983 | Grandjean et al. |
| 4,468,663 A | 8/1984 | Kalt |
| 4,488,784 A | 12/1984 | Kalt et al. |
| 4,695,837 A | 9/1987 | Kalt |
| 4,747,670 A | 5/1988 | Devio et al. |

(Continued)

FOREIGN PATENT DOCUMENTS

| | | |
|---|---|---|
| EP | 1241507 A2 | 9/2002 |
| JP | H10249278 A | 9/1998 |

(Continued)

*Primary Examiner* — Hang Lin
(74) *Attorney, Agent, or Firm* — Lerner, David, Littenberg, Krumholz & Mentlik, LLP (57) ABSTRACT

A shutter system includes a substrate having a front surface with a length and a width, and a conductive layer on a portion of the front surface of the substrate; a dielectric layer disposed on the conductive layer; and an electrostatic shutter having a proximal end attached to the dielectric layer such that a portion of the shutter is in direct physical contact with the dielectric layer at a point at or adjacent the attached proximal end. The shutter is configured to transition between extended and retracted configurations. In the same or an alternative embodiment, the system includes a reinforcement configured such that when the shutter is in the extended configuration, an edge at a distal end of the shutter opposite the proximal end remains substantially parallel to the proximal end of the shutter as the shutter transitions from the extended configuration to the retracted configuration.

50 Claims, 6 Drawing Sheets

(56) References Cited

U.S. PATENT DOCUMENTS

| | | |
|---|---|---|
| 4,788,089 A | 11/1988 | Skipper |
| 4,915,486 A | 4/1990 | Hansen |
| 4,978,952 A | 12/1990 | Irwin |
| 5,231,559 A | 7/1993 | Kalt et al. |
| 5,519,565 A | 5/1996 | Kalt et al. |
| 5,554,434 A | 9/1996 | Park et al. |
| 5,629,790 A | 5/1997 | Neukermans et al. |
| 5,638,084 A | 6/1997 | Kalt |
| 6,057,814 A | 5/2000 | Kalt |
| 6,075,639 A | 6/2000 | Kino et al. |
| 6,081,304 A | 6/2000 | Kuriyama et al. |
| 6,229,501 B1 | 5/2001 | Roth et al. |
| 6,317,108 B1 | 11/2001 | Kalt |
| 6,557,279 B2 | 5/2003 | Araki et al. |
| 6,559,827 B1 | 5/2003 | Mangerson |
| 6,590,626 B1 | 7/2003 | Suzuki et al. |
| 6,692,646 B2 | 2/2004 | Kalt et al. |
| 6,771,237 B1 | 8/2004 | Kalt |
| 6,897,786 B1 | 5/2005 | Kalt et al. |
| 6,972,888 B2 | 12/2005 | Poll et al. |
| 7,085,609 B2 | 8/2006 | Bechtel et al. |
| 7,645,977 B2 | 1/2010 | Schlam et al. |
| 7,705,826 B2 | 4/2010 | Kalt et al. |
| 8,035,075 B2 | 10/2011 | Schlam et al. |
| 8,134,112 B2 * | 3/2012 | Schlam .............. E06B 9/24 |
| | | 250/214 B |
| 8,736,938 B1 | 5/2014 | Schlam et al. |
| 2002/0054033 A1 | 5/2002 | Nakamura et al. |
| 2002/0144831 A1 | 10/2002 | Kalt |
| 2003/0099097 A1 * | 5/2003 | Mok .................. H05K 7/1061 |
| | | 361/767 |
| 2004/0001033 A1 | 1/2004 | Goodwin-Johansson et al. |
| 2005/0078104 A1 | 4/2005 | Matthies et al. |
| 2006/0169980 A1 | 8/2006 | Morita et al. |
| 2008/0115428 A1 * | 5/2008 | Schlam .................. E06B 9/24 |
| | | 52/173.1 |
| 2009/0225396 A1 | 9/2009 | Sampsell |
| 2010/0172007 A1 | 7/2010 | Schlam et al. |
| 2011/0227080 A1 | 9/2011 | Roh et al. |
| 2013/0088856 A1 | 4/2013 | Kim et al. |
| 2013/0126337 A1 * | 5/2013 | Grant .................. C25C 3/16 |
| | | 204/228.6 |
| 2015/0023051 A1 | 1/2015 | Jepsen et al. |
| 2015/0155340 A1 | 6/2015 | Lim et al. |
| 2015/0300812 A1 | 10/2015 | Bastani et al. |
| 2017/0140679 A1 | 5/2017 | Tomoda et al. |
| 2017/0154583 A1 | 6/2017 | de Greef |
| 2019/0086731 A1 * | 3/2019 | Schlam ............. G02F 1/133615 |

FOREIGN PATENT DOCUMENTS

| | | |
|---|---|---|
| JP | 2000089208 A | 3/2000 |
| JP | 2005089643 A | 4/2005 |
| KR | 20090008928 A | 1/2009 |
| KR | 20120023510 A | 3/2012 |
| KR | 20130011845 A | 1/2013 |
| KR | 20130037435 A | 4/2013 |
| KR | 20150063773 A | 6/2015 |

* cited by examiner

OPTICAL SHUTTER AND DISPLAY PANEL

BACKGROUND OF THE INVENTION

The present invention relates to electronic lightweight optical shutters and related digital signage of all types, especially outdoor signage such as billboards, street furniture, on-site signage and traffic signage. Preferred embodiments relate to programmable signs which are highly visible especially outdoors where the sun can reduce the visibility of typical electronic displays.

There is a growing use of outdoor displays, particularly in the field of advertising referred to as Digital Out Of Home (DOOH). These displays are used for advertising, public information and other applications as well. In cases where the displays are sheltered from the sunlight, displays made for consumer use such as televisions and computer monitors may be adapted for this use. However, when the displays are exposed to the outdoors and sunlight, consumer display products don't have enough contrast to be seen in that environment since the sunlight reduces the contrast and washes out the legible information on the display screen. This problem is particularly the case for outdoor billboards and other public displays such as those used for automobile traffic signage.

The only current technology which is effectively used for these applications is light emitting diodes (LED). These LED displays are made from constructed individual display tiles which are assembled (tiled) to create a display of any desired size. The LEDs are driven with extremely high luminance, typically 7000 nits or higher, in order to combat the negative impact of the sunlight shining on them. These displays suffer from numerous fundamental problems examples of which are (1) They are very power hungry due to the required high luminance, (2) they are very heavy due to the high-power electronics, (3) the high luminance can be very disturbing to the nearby population at night, (4) they can cause electromagnetic interference due to the high current flow, and (5) they are very expensive.

More traditional examples of outdoor applications are instructions, messages or information for the public as signs in front of houses of worship, advertising in front of retail establishments or information in front of public buildings or transportation facilities typically referred to as on-site signage. These applications also require sunlight legibility but are typically very price sensitive. Manual message boards where dark colored plastic letters are physically mounted on a white background are typically used in many such applications. These implementations are of course labor intensive and certainly not amenable to real time updating.

U.S. Patent Application Publication No. 2019/0086731 ("the '731 Application"), the disclosure of which is hereby incorporated herein by reference, by the same applicant as the present application, describes a reflective display technology that utilizes collections (arrays) of individual polymer shutters that provides a solution to these problems; however, that technology may require the use of direct drive electronics, i.e. one electronic driver per shutter, which can add weight and cost to the electronic drivers.

Figure 1A:
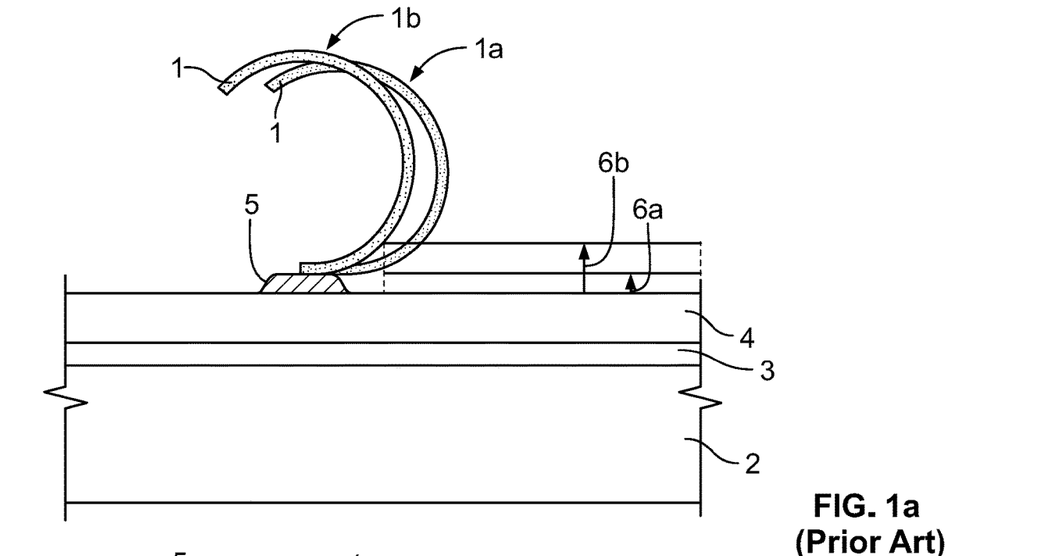
FIGS. 1a and 1b are side views of prior art shutters in their retracted and extended configurations, respectively.

FIG. 1a depicts a prior art shutter system showing a shutter 1 in two possible positions 1a, 1b for illustrative purposes. The structure comprises a bare substrate 2 coated only with a thin conductive layer 3 and a dielectric layer 4. The shutters 1, as shown retracted, are attached to the substrate 2 by means of a bead of adhesive 5. The material of the shutter 1 is then firmly affixed to the adhesive 5 through the use of a roller. The lines of adhesive 5 are typically printed on the surface of the dielectric layer 4. The substrate 2 with the shutter 1 attached is then heated in order to tightly curl the shutter 1. As can be seen, the result of the heating process and the adhesive bead is that the retracted shutters 1 are slightly elevated from the substrate 2 beyond the adhesive line 5 and slightly displaced from each other, i.e. curled up to different degrees so that they are not perfectly aligned.

Because of the thinness and ductile nature of the polymer of which the shutter 1 is typically made, the attachment process and the heating process may finally affix the shutter 1 to the adhesive line 5 in a variety of curled positions as depicted as positions 1a and 1b or the shutters 1 may have slightly different curvatures. The net impact is that two different shutters 1 may have slightly different heights 6a, 6b from the substrate at positions immediately adjacent to the line of adhesive 5.

The strength of the electric field that attracts a shutter 1 (i.e. the conductive material therein) to the conductive layer 3 on the substrate 2 and causes it to extend is the ratio of the applied voltage divided by the effective height A of the shutter 1 from the conductive layer 3 on the substrate 2, as depicted by heights 6a and 6b plus the dielectric thickness. Since the required electric field to extend the shutter 1 is typically the same for the two shutter positions 1a, 1b shown in FIG. 1a because the dielectric thickness is typical uniform, it is clear that each shutter 1 requires a different drive voltage since essentially a significant portion of the drive voltage is used to electrostatically bring the shutter 1 in contact with the substrate 2, which as stated may involve slightly different distances to the substrate 2 for different shutters 1. This range of voltages can be problematic for a single shutter since it can require an adjustable power supply for the shutter products or for an array of shutters and can foil the ability to passively x-y multiplex the array. The voltage V required to extend a shutter is represented by the relationship $V \sim \sqrt{V(kA+d)/d}$ where k=dielectric constant of the dielectric layer 4; d=dielectric layer thickness; and A=airgap thickness (i.e. height 6a or 6b), the effective height of the shutter above the dielectric. The slightest difference in airgap thickness A of just a few microns from shutter to shutter can change the required drive voltage from nominally 320 volts to as high as 390 volts or higher. With the prior art construction, the relatively large variation in required drive voltage from shutter to shutter can make simple passive multiplexing very difficult since passive multiplexing requires very small differences in drive voltage from shutter to shutter, typically described as a narrow $\Delta V$.

Figure 1B:
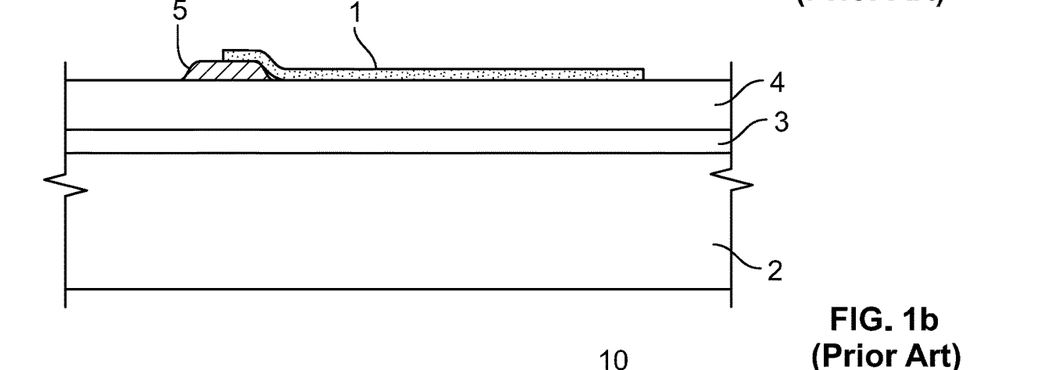
Figure 2:
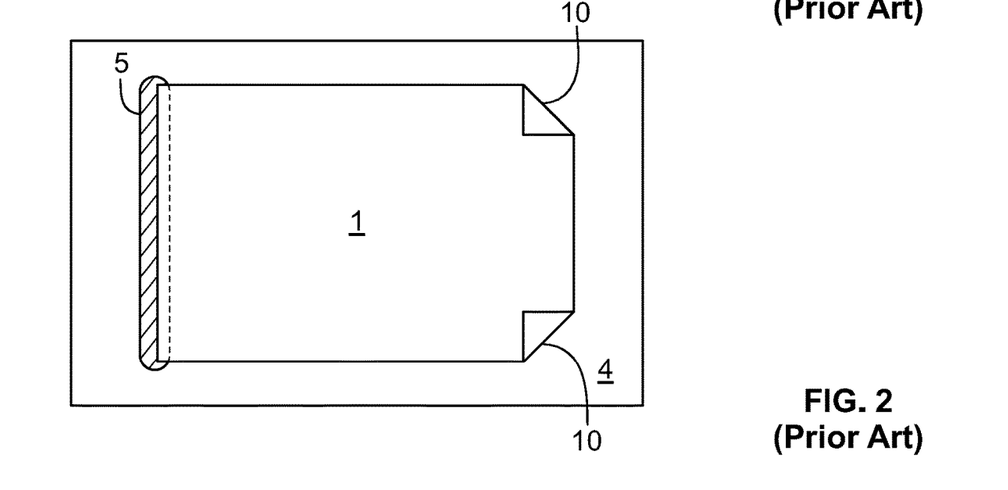
FIG. 2 is a top view of a fully extended prior art shutter beginning to retract.

FIG. 1b depicts the fully extended shutter 1, which is held to the substrate 2 by the residual electrical field that caused its extension. The voltage is reduced to retract the shutter 1 to its original curled state. As the electrostatic force reduces to zero, the shutter 1 begins to retract because of its built-in spring constant. Since the corners of the shutter 1 offer less resistance to the electric field from the restoring spring force, in many cases the corners begin to retract before the entire shutter 1 begins to retract. FIG. 2 is a top view of an extended shutter 1 and retracted corners 10. This may cause distortion in the retracting shutter 1 causing it to fold on itself or not to fully retract or as a minimum prevent the shutter from retracting substantially parallel to the proximal end of the shutter.

The present invention provides improvements that address the shortcomings of the prior art designs, and expands upon the technology taught in U.S. Pat. No. 5,638,084 (titled Lighting-Independent Color Video display), U.S. Pat. No. 6,692,646 (titled Method of Manufacturing a Light Modulating Capacitor Array and Product), U.S. Pat. No. 6,897,786 (titled Passively Illuminated, Eye-Catching Display for Traffic Signs), and U.S. Pat. No. 7,705,826 (titled Flexible Video Displays and Their Manufacture), the disclosures of which are hereby incorporated herein by reference.

BRIEF SUMMARY OF THE INVENTION

The present display technology is reflective, that is it does not create light but reflects ambient light to the observer in the desired pattern to be displayed. The main advantage of using reflected light is significantly reduced power consumption. A prime disadvantage as seen in existing mainstream reflective displays is limited reflectivity making the technologies inappropriate for outdoor use in direct sunlight. This invention overcomes that limitation with a structure that enables the incorporation of very high reflectivity white materials, such as $TiO_2$ very much like the white boards used in the manually implemented message boards mentioned earlier. This is coupled with electronic multiplexibility, high reliability, tilability and very low cost.

This invention is based on an improved single shutter configuration. The invention improves upon the single shutter by adding extension (rolling out) and retraction (rolling up) structural implementations that make the shutter operation highly reliable and significantly narrowing the variation in drive voltage, $\Delta V$, for such shutters thereby enabling the multiplexing of a shutter array (defined as a collection of shutters) in a display panel. These single shutters are very inexpensive and extremely lightweight making them particularly suitable for cameras or other light sensitive instruments where weight is an issue such as in aerospace and outer space applications.

Aspects of our display technology have been reported previously as seen in the '731 Application related to this technology. The technology utilizes small, thin, coated polymer foils (shutters) that are rolled up very tightly (retracted) in their ambient state and fully rolled out (extended) when a voltage is applied. Each of these small shutters serves as an optical valve as part of a display pixel. When the shutter is fully retracted it exposes that portion of the underneath substrate, which may be chosen to be a highly reflective surface and may be white, black, red, green, blue or any color. Since the substrate's optical properties are fixed and completely independent of the chemistry and electrical functionality of optical molecules, its contrast can be chosen from the highest of available reflective materials.

Other reflective display technologies such as some forms of liquid crystal and various "electronic inks" have been tried for this application but they fall short because their background reflectivity, image darkness and color rendition are inextricably linked to the fundamental properties of their optical molecules. Improvement of one such property degrades the other.

Other previously reported implementations of our shutter-based technology have had certain important limitations. They all, except for the '731 Application, have disclosed the use of transparent substrates. This has traditionally been an essential form of the technology since its operation has required a very thin transparent coating, a dielectric, to be placed between the shutters and a transparent conductive coating on the transparent substrate. The transparent structure also provides the possibility of backlighting. However, a transparent substrate results in limited contrast for an outdoor sign because of optical losses and unwanted reflections. Another limitation of the prior technology is the inability for it to be multiplexed well thereby requiring extensive direct drive circuitry. A third limitation is the fragility and difficulty to manufacture, including low manufacturing yield, because of the use of primarily glass substrates and the need to laminate thin polymer dielectric films to the glass and the unreliable functionality of the thin polymer shutters.

The present inventions replace the transparent dielectric with an opaque dielectric enabling it to also function as the reflective medium. Since it is placed near the front (viewing surface) of the display with only the shutter array in front of it, the display may have extremely high contrast. The transparent substrate may now be replaced with a primarily opaque substrate. With the opaque dielectric functioning as a reflector an opaque substrate may now be constructed with a traditional printed circuit board (PCB) with white or another colored or a multicolored solder mask serving as the dielectric. The multiple colors may be patterned to correlate with the shutters to create a full color display. Solder masks are routine and commonplace coatings on PCBs. The highly developed worldwide manufacturing infrastructure for PCBs enables this new display technology to be manufactured at very high yield and throughput at extremely low cost.

The present inventions also add the functionality of the new single shutter configuration which makes all of the shutters very reliable and importantly minimizes the differences in their threshold operating voltages, $\Delta V$, thereby allowing them to be electrically multiplexed.

The rollout mechanism itself and displays incorporating many rollouts have been disclosed previously in patents by Kalt and others (such as U.S. Pat. No. 5,638,084 mentioned above). The rollout mechanism has also been modified by U.S. Pat. No. 7,645,977, the disclosure of which is hereby incorporated herein by reference, in order to create very large single rollouts which function as electronic window shades. The window shades are generally many inches to many feet in size and therefore require significant modifications to the fundamental rollout technology in order to function properly and be correctly manufactured. The rollouts used in displays however are much smaller in size and have different functionality and manufacturing issues. Kalt in U.S. Pat. No. 5,638,084 points out that these rollouts used in displays range in size from about 0.01-inch up to about 1-inch. We agree with that assessment. On the other hand, the sizes of window shades made with the present technology range from 14-inches long to greater than 5-feet long.

The present rollouts made with thin, very flexible polymer film of PEN, PET, polyimide or other flexible material are coated on one or both sides with a thin conductive coating, typically metal such as Al or conductive metal oxide such as indium tin oxide. The differences between the display shutters and window shades are substantial. The shutters are made with ultra-thin polymers in the thickness range of 1 to 5 microns for them to roll up compactly with a very small diameter of approximately 0.04 inch. The window shades on the other hand are made with thicker polymer of the order of 15 microns thickness, and after being processed they roll up with a diameter of about 0.4 inch.

Producing the present shutters involves the following process. After the polymer is cut into shutter size flaps it is simply heated and the material's natural curl will tighten it into the narrow rollup. On the other hand, the window shade must be handled deliberately because of its large size. It is typically rolled on a mandrel very carefully in order to ensure that it is rolled evenly. The processing temperature is considerably higher than that for the shutters. It is removed from the mandrel and carefully unrolled and perhaps trimmed to account for thermal non-uniformity.

The performance and weight of the present shutter compared to the prior art shade is also considerably different. A typical shutter traverses its approximate 1-inch length in about 3 milliseconds for a speed of 333 inches/second. The shade traverses its 14-inch length in about 1 second for a speed of 14 inches/second. The total weight and speed of the shade creates a delta momentum impact on the locking restraint at the end of the shade's travel that is approximately 17 times greater than that of the shutter.

In the present technology, one or both sides of the polymer film are coated with ink to impart a color to the film. The film is cut to size, attached to its substrate and heated beyond the glass transition temperature of the polymer, causing it to shrink while the conductive coating tends not to shrink, thereby causing the film to curl up into its new normal retracted position. One edge of the film is attached to a substrate upon which there is a conductive coating overlaid by a dielectric. The sequential structure of conductive coating on the flexible polymer film/dielectric/conductive coating on the substrate, forms a capacitor with the conductive coatings acting as the capacitor's electrodes. When a voltage is placed across this capacitor, an attractive force becomes present between the conductive coatings as in any capacitor. This force causes the flexible film to unroll (extend) and lie flat on the substrate. The single shutter may itself be used in several applications. As such, it may use either a transparent or light blocking substrate or dielectric depending on its intended function. However, its agglomeration into an array of shutters is primarily intended for use as a flat panel display although other uses may be derived. The current invention places the shutter in intimate contact with the dielectric layer and configures the substrate/shutter system such that the shutter can retract normally without distorting.

In the present invention a collection (array) of shutters is typically assembled in rows and columns with X and Y dimensions on a substrate. Electrical contacts and electronic drivers are provided to extend and retract the shutters as desired. A diffuse opaque reflector is placed just under the shutters such that ambient lighting shines directly on the reflector, only blocked by an extended shutter when desired. The diffuse reflector returns essentially all of the reflected light to the viewer whereas the inked shutter essentially absorbs all of the ambient light. This creates extremely high contrast. The resultant substrate with said attachments is a display panel. The display panel may be configured as a display tile such that like panels may be butted against each other on all four sides with continuous spacing of shutters across display panels. This can be achieved by maintaining uniform spacing of shutters across the tile with the four edges of the tile having spacing of the shutters to the tile edge being ½ of the uniform spacing everywhere else on the tile. In this manner larger displays may be created by assembling (tiling) a number of tiles edge to edge in the X and Y direction.

The resultant display will have very low power consumption because it is only moving extremely lightweight shutters rather than creating high intensity light. It utilizes ambient light and has very high contrast especially in direct sunlight. Although it will not be very legible in the dark, this is easily remediated by providing external front lighting similar to that provided with traditional printed billboards.

A first aspect of the present invention is a shutter system including a substrate having a front surface with a length and a width, and a conductive layer on a portion of the front surface of the substrate, a dielectric layer disposed on the conductive layer, and an electrostatic shutter having a proximal end attached to the dielectric layer such that a portion of the shutter is in direct physical contact with the dielectric layer at a point at or adjacent the attached proximal end, wherein the shutter is configured to transition between an extended configuration in which the shutter is extended and disposed on the dielectric layer to cover a portion of the dielectric layer and a retracted configuration in which the shutter is rolled-up to expose the portion of the dielectric layer, whereby, when a voltage is applied between the conductive layer and the electrostatic shutter, a potential difference between the conductive layer and the electrostatic shutter causes the shutter to transition from the retracted configuration to the extended configuration.

In other embodiments according to this first aspect, the shutter may be attached to the dielectric layer with an adhesive, and a bar may force the portion of the shutter to be in direct physical contact with the dielectric at the point at or adjacent the attached proximal end. The bar may be comprised of metal or plastic. The shutter may be welded to the dielectric layer to force the shutter to be in direct physical contact with the dielectric at the point at or adjacent the attached proximal end. The shutter may be comprised of a polymer. The shutter may be comprised of an organic material. The shutter may be comprised of an inorganic material. The shutter may include an ink coating. The shutter may include a conductive coating.

A display panel may include the aforementioned shutter system, wherein the conductive layer is a conductor patterned on the front surface of the substrate, wherein the dielectric layer is a diffuse reflecting opaque dielectric, and drive electronics on a side of the substrate opposite the front surface, wherein the electrostatic shutter includes a plurality of the electrostatic shutters, each shutter of the plurality of electrostatic shutters attached to the dielectric layer at the proximal end thereof such that a portion of the respective shutter is in direct physical contact with the dielectric layer at a point at or adjacent the respective attached proximal end.

The substrate and the conductive layer may comprise a printed circuit board. The printed circuit board may define vias therethrough through which the drive electronics connect with the patterned conductor. The opaque dielectric may be a solder mask. The opaque dielectric may be at least one color. The opaque dielectric may be only one color.

The drive electronics may be configured for direct drive or multiplex drive of the shutters. The drive electronics may be configured as an active matrix multiplexer of the shutters. Each of the shutters may be attached to the dielectric layer with an adhesive and one of a plurality of bars extending along the width of the substrate, each bar of the plurality of bars in contact with at least substantially all of the shutters aligned in a respective row or column of shutters disposed along the width of the substrate such that substantially all of the shutters are in direct physical contact with the dielectric at respective points at or adjacent the attached proximal end of each shutter. For at least some of the plurality of bars, the bar may be positioned as a reinforcement to a row or column of shutters immediately proximal to the row or column of shutters with which the bar is in contact, such that when each shutter of the immediately proximal row or column of shutters is in the extended configuration, an edge at a distal end of the shutter opposite the proximal end remains substantially parallel to the proximal end of the shutter as the shutter transitions from the extended configuration to the retracted configuration. Each of the shutters may be welded to the dielectric layer which forces each shutter to be in direct physical contact with the dielectric layer at the point at or adjacent the attached proximal end of each shutter, respectively.

A static or video display may include a plurality of the aforementioned display panels arranged to form the display, wherein in each of the display panels, the plurality of shutters and the drive electronics are configured so that the display panels are abutted at adjacent peripheral edges to form the display with substantially no perceived optical interface between adjacent tiles, wherein the spacing among the shutters of a single display panel is consistent and is substantially identical to the spacing among shutters across a boundary between abutted display panels. The static or video display may further include external front lighting. The static or video display may further include an attached cover. The clear cover may include an antireflective coating.

A second aspect of the present invention is a shutter system including a substrate having a front surface with a length and a width, and a conductive layer on a portion of the front surface of the substrate, a dielectric layer disposed on the conductive layer, an electrostatic shutter having a proximal end attached to the dielectric layer at an attachment location along the width of the front surface of the substrate, wherein the shutter is configured to transition between an extended configuration in which the shutter is extended and disposed on the dielectric layer to cover a portion of the dielectric layer and a retracted configuration in which the shutter is rolled-up to expose the portion of the dielectric layer, and a reinforcement configured such that when the shutter is in the extended configuration, an edge at a distal end of the shutter opposite the proximal end remains substantially parallel to the proximal end of the shutter as the shutter transitions from the extended configuration to the retracted configuration, whereby, when a voltage is applied between the conductive layer and the electrostatic shutter, a potential difference between the conductive layer and the electrostatic shutter causes the shutter to transition from the retracted configuration to the extended configuration.

In other embodiments according to this second aspect, the reinforcement may be a bar attached to the dielectric layer and/or the substrate and spaced from the attachment location of the shutter to the dielectric layer by a distance that is less than a full length of the shutter defined between the proximal and distal ends of the shutter, such that when the shutter is in the extended configuration, the shutter contacts the reinforcement and cannot be completely unrolled. The bar may be comprised of metal or plastic. The shutter may include the reinforcement at the distal end of the shutter itself and the reinforcement may be relatively stiffer than a remainder of the shutter, such that when the shutter is in the extended configuration, the reinforcement remains substantially parallel to the attachment location of the shutter to the dielectric layer as the shutter transitions from the extended configuration to the retracted configuration. The distal end of the shutter with the reinforcement may be thicker than the remainder of the shutter. The proximal end of the shutter may be attached to the dielectric layer at the attachment location with an adhesive. The shutter may be comprised of a polymer. The shutter may be comprised of an organic material. The shutter may be comprised of an inorganic material. The shutter may include an ink coating. The shutter may include a conductive coating.

A display panel may include the aforementioned shutter system, wherein the conductive layer is a conductor patterned on the front surface of the substrate, wherein the dielectric layer is a diffuse reflecting opaque dielectric, and drive electronics on a side of the substrate opposite the front surface, wherein the electrostatic shutter includes a plurality of the electrostatic shutters each shutter including a reinforcement configured such that when the shutter is in the extended configuration, an edge at a distal end of the shutter opposite the proximal end remains substantially parallel to the proximal end of the shutter as the shutter transitions from the extended configuration to the retracted configuration.

The substrate and the conductive layer may comprise a printed circuit board. The printed circuit board may define vias therethrough through which the drive electronics connect with the patterned conductor. The opaque dielectric may be a solder mask. The opaque dielectric may be at least two different colors. The opaque dielectric may be at least one color.

The drive electronics may be configured for direct drive or multiplex drive the shutters. The drive electronics may be configured as an active matrix multiplexer of the shutters. The plurality of shutters may be arranged in a plurality of shutter rows or columns each disposed along the width of the substrate, and wherein the reinforcement is a plurality of bars each extending along the width of the substrate, each bar of the plurality of bars attached to the dielectric layer and/or the substrate and spaced from the attachment locations of at least substantially all of the shutters aligned in one of the shutter rows or columns by a distance that is less than a full length of the shutters defined between the proximal and distal ends of the shutters, such that when the shutters are in the extended configuration, the shutters contact the respective bar and cannot be completely unrolled. Each of the plurality of bars may be comprised of metal or plastic. For at least some of the plurality of bars, the bar may be positioned with respect to a row or column of shutters immediately distal to the row or column of shutters with which the bar is associated, such that each shutter of the immediately distal row of shutters is in direct physical contact with the dielectric layer at a point at or adjacent the attached proximal end. Each shutter of the plurality of electrostatic shutters may include the reinforcement at the distal end of the shutter itself and the reinforcement may be relatively stiffer than a remainder of the shutter, such that when the shutter is in the extended configuration, the reinforcement remains substantially parallel to the attachment location of the shutter to the dielectric layer as the shutter transitions from the extended configuration to the retracted configuration. In each shutter of the plurality of electrostatic shutters, the distal end of the shutter with the reinforcement may be thicker than the remainder of the shutter. In each shutter of the plurality of electrostatic shutters, the proximal end of the shutter may be attached to the dielectric layer at the attachment location with an adhesive.

A static or video display may include a plurality of the aforementioned display panels arranged to form the display, wherein in each of the display panels, the plurality of shutters and the drive electronics are configured so that the display panels are abutted at adjacent peripheral edges to form the display with substantially no perceived optical interface between adjacent tiles, wherein the spacing among the shutters of a single display panel is consistent and is substantially identical to the spacing among shutters across a boundary between abutted display panels. The static or video display may further include external front lighting. The static or video display may further include an attached cover. The clear cover may include an antireflective coating.

DETAILED DESCRIPTION

The present invention describes improvements to the reflective display technology of the '731 Application that make it more suitable for the above uses including the ability to routinely apply multiplexing drive electronics and also making the display technology more reliable. The fundamental improvements relate to improvements in the single shutter construction and their construction into an array of shutters to form the improved display panel.

As depicted in FIGS. 3a-3d, a shutter system 100 includes a substrate 102 having a front surface 102a with a length and a width, and a conductive layer 103 on a portion of the front surface 102a of the substrate 102 with no intervening added elements or layers. A dielectric layer 104 is disposed on the conductive layer 103, and may also be disposed on the front surface 102a of the substrate 102 that is not covered by the conductive layer 103. The material of the dielectric layer 104 can be applied directly to the conductive layer 103, or if the conductive layer 103 is patterned, directly to the substrate 102 with the intervening conductive pattern, in either case with no intervening elements or layers. When a dielectric material is applied to a patterned conductive layer, the dielectric material contacts both the conductive pattern and the exposed portions of the front surface 102a of the substrate 102 between the aspects of the pattern. In either scenario, the dielectric layer 104 is disposed directly on the conductive layer 103, which in some cases additionally means there is contact between the dielectric layer 104 and the front surface 102a of the substrate 102.

An electrostatic shutter 101 is disposed directly on the dielectric layer 104 with its proximal end 108 attached at an attachment location along the width of the front surface 102a of the substrate 102. The proximal end 108 of the shutter 101 is attached to the dielectric layer 104 with an adhesive or by welding at the attachment location. The shutter 101 is comprised of a polymer and can also be made of other organic or inorganic material. The shutter 101 further includes a conductive layer or coating, and can include an ink coating. As indicated above, the shutter 101 is configured to transition between an extended configuration in which the shutter 101 is extended to cover a portion of the dielectric layer 104 and a retracted configuration in which the shutter 101 is rolled-up to expose the portion of the dielectric layer 104. The shutters 101 are relatively small, particularly compared with the larger window shades of the prior art, with some shutter embodiments having a full length less than or equal to one inch and a full width less than or equal to one inch. When a voltage is applied between the conductive layer 103 and the conductive layer on the shutter 101, a potential difference between the conductive layer 103 and the conductive layer on the shutter 101 causes the shutter 101 to transition from its retracted configuration to its extended configuration.

Figure 3A:
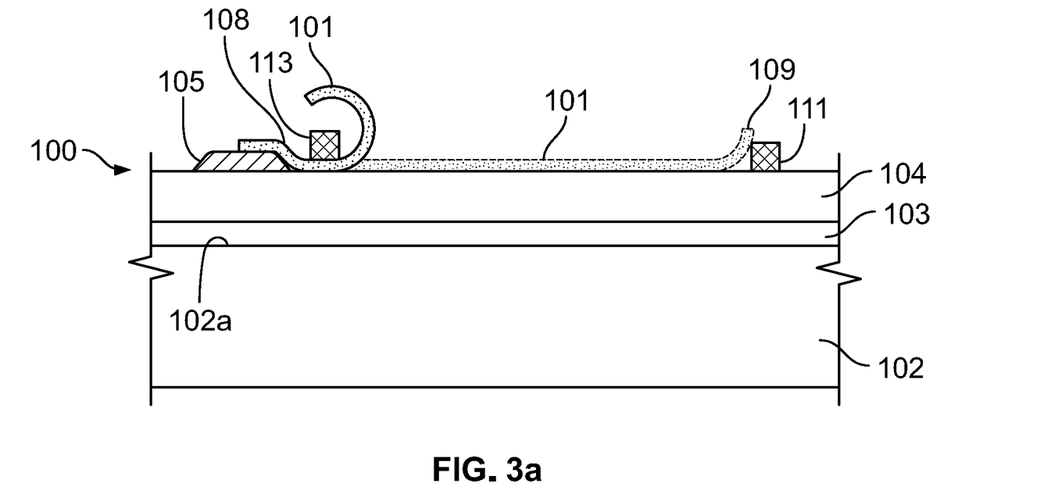
FIGS. 3a and 3b are side and top views, respectively, of a shutter system incorporating an example of a retraction and extension implementation in accordance with one embodiment of the present invention.
Figure 3B:
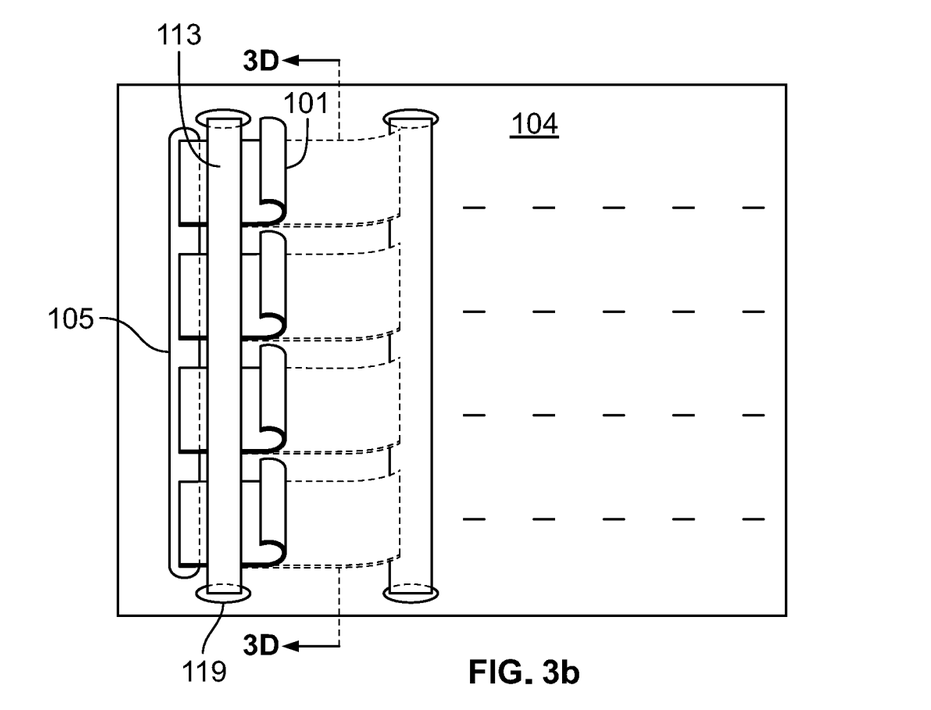

As shown in FIGS. 3a and 3b, a bar 113 is a reinforcement or a structural implementation attached along the width of the substrate 102 to the dielectric layer 104 and/or to the substrate 102 adjacent the location at which the proximal end 108 is attached to the substrate 102. This adjacent location or point is at, adjacent, or immediately next to the attachment of the shutter 101 so that the portion of the shutter 101 after the attached portion that comes in contact with the dielectric layer 104 can be firmly adhered to the dielectric layer with no intervening elements or layers. This adjacent location or point is very close to or abutting the adhesive layer 105, such as within a distance equal to 10 percent of the overall length of the shutter. In some embodiments, the adjacent location or point is within 0.2 mm of the attachment location or adhesive layer 105. Ultimately, the bar 113 should be as close to the attachment as possible. This bar extension structure 113 fixes the position of the shutter 101 and firmly holds the shutter 101 in direct physical contact with the dielectric 104 in such a manner as to ensure that any produced shutter 101, regardless of its initial position, is essentially at the same position relative to the dielectric 104 as any other shutter 101. In this case when the extension voltage is applied, it is solely used to extend the shutter 101 since the shutter 101 is already resting on the dielectric layer 104, which is in intimate and direct contact with the substrate 102 (or the conductive layer 103 or both as explained above). Positive impacts of the bar 113 and its effect of firmly holding the shutter 101 to the dielectric 104 are (1) to minimize the voltage required to extend the shutter 101 and (2) to reduce this required voltage's variation from shutter to shutter, $\Delta V$. This allows the shutters to be passively electrically multiplexed.

The reinforcement or bar 113 can be made of metal or plastic (if plastic it may have a conductive coating if required), and can be anchored by attaching it to the dielectric layer 104 and/or the substrate 102 with adhesive 119, or by welding the bar 113 to metallization on the substrate 102 or by other means. The bar 113 can straddle the shutter 101 and be attached to the dielectric layer 104 and/or the substrate 102 on either or both sides of the shutter 101 by welding or adhesive as indicated above.

Figure 3C:
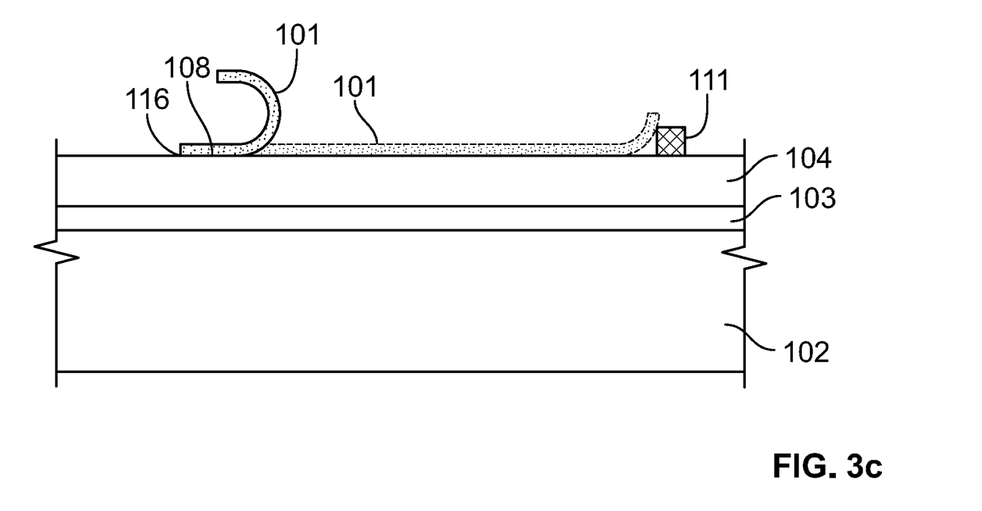
FIG. 3c is a side view of a shutter system incorporating an example of a weld in accordance with another embodiment of the present invention.

Another example to achieve this result is by attaching the shutter 101 to the dielectric 104 such that any fabricated shutter 101 is at the essentially the same angle and in direct physical contact with the dielectric at the attached proximal end with respect to the dielectric 104 as any other shutter 101. As depicted in FIG. 3c, this may be accomplished by welding the shutter 101 to the dielectric 104 and/or substrate 102 at a location 116 right at the attachment at the proximal end 108 of the shutter 101 or by other means. In this case, the bar 113 need not be applied since the shutter 101 is already flush and in direct physical contact with the dielectric layer 104 since the adhesive line 105 is absent.

In a further embodiment of the present invention, a retraction structural implementation such as a bar 111 as depicted in FIG. 3a is a reinforcement that prevents the shutter 101 from completely unrolling and lying completely flat on the substrate 102. As such, when the extension voltage is removed to retract the shutter 101, the diagonal forces at the corners of the shutter 101 have already been relieved or were never present given that the shutter 101 was not completely unrolled, and so the shutter 101 will retract normally by simply rolling up such that its curvature's longitudinal axis is parallel to the substrate and perpendicular to the direction of motion. The retraction structural implementation such as the bar 111 depicted in FIG. 3a extends along the width of the substrate 102 and is an example of a structure used to prevent the shutter corners from retracting before the full extended distal edge 109 of the shutter 101 retracts. When the shutter 101 is in the extended configuration, the distal edge 109 of the shutter 101 opposite the proximal end 108 remains substantially parallel to the proximal end 108 and the attachment location of the shutter 101 as the shutter 101 transitions from the extended configuration to the retracted configuration. The bar 111 is spaced from the attachment location of the shutter 101 to the dielectric layer 104 by a distance that is less than a full length of the shutter 101 defined between its proximal and distal ends 108, 109. In this way, when the shutter 101 is in the extended configuration, the shutter 101 contacts the bar 111 and cannot be completely unrolled. Bar 111 can have the same properties and attachment to the device as indicated above for bar 113, of course at the location indicated for bar 111.

Figure 4:
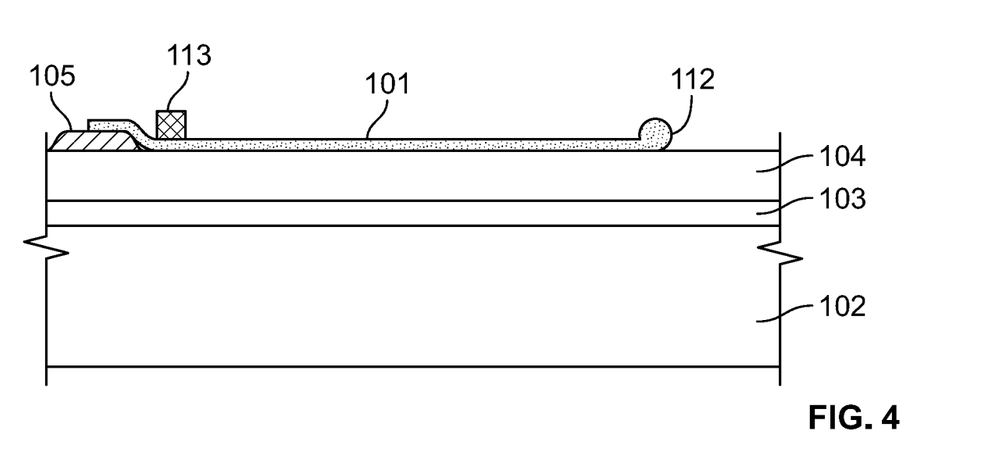
FIG. 4 is a side view of a shutter system incorporating an example of a stiff reinforcement in accordance with another embodiment of the present invention.

Other shapes or positions of a reinforcement implementation such as bar 111 may be used as well to accomplish the same result. Another example of how the corners may be prevented from retracting first is depicted in FIG. 4. In this example a stiff reinforcement 112 is applied to the distal edge 109 of the shutter 101 during the manufacturing process. This may be applied for example during the laser cutting of the shutter 101 from its polymer film source by applying enough heat to melt the distal shutter edge 109 which then forms a stiff bead 112 when re-solidifying. The stiff bead 112 prevents the shutter corners from releasing before the entire distal edge 109 of the shutter releases. Ultimately, the reinforcement 112 at the distal end 109 of the shutter 101 is relatively stiffer than a remainder of the shutter 101, such that when the shutter 101 is in the extended configuration, the reinforcement 112 remains substantially parallel to the attachment location of the shutter 101 to the dielectric layer 104 and/or the substrate 102 as it transitions from the extended configuration to the retracted configuration. Reinforcement 112 may be thicker than the remainder of the shutter 101 as well, such as by 25%, 50%, 75%, or 100% or more. There may be other embodiments that accomplish the task as bar 111 and reinforcement 112. This implementation may accomplish its goal without the need of bar 111, meaning that the stiff bead 112 permits shutter 101 to roll out completely flat while also preventing the distal corners from releasing first.

The above described shutters 101 may be used for a variety of applications such as a lightweight lens shutter or as a means of blocking displayed information from a person viewing a display or as a radiation or heat shield for whatever the shutter 101 is blocking. As a lightweight, fast responding shutter 101 it would replace the much heavier or manually operated mechanical shutter mechanisms associated with these needs.

Figure 5:
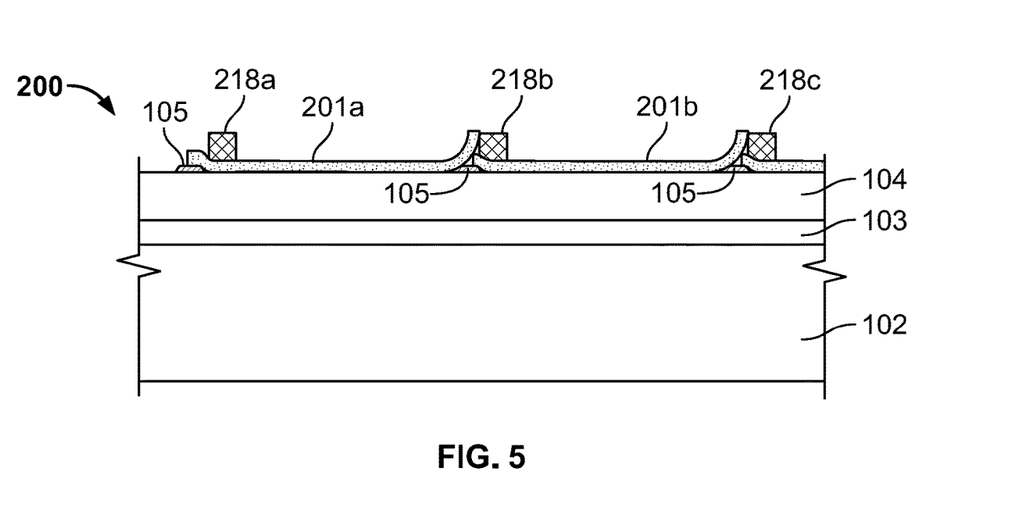
FIG. 5 is a side view of a shutter system incorporating an example of a retraction and extension implementation in accordance with the present invention.

The above described shutters 101 may be assembled to function as an array of shutters 101 which function as light valves in a reflective flat panel display. In this regard, FIG. 5 depicts a display panel 200 including a substrate 102 with two attached shutters 201a, 201b and three structural extension/retraction implementations 218a, 218b, 218c as an example. Shutter 201a on the left and shutter 201b on the right both extend along the length of the front surface 102a of the substrate 102. The center structure 218b is shown to serve as an extension structure for the shutter 201b to its right and a retraction structure for the shutter 201a to its left. That is, center structure 218b acts as a bar 113 for shutter 201b and as a bar 111 for shutter 201a in conjunction with the discussion above explaining the benefits of each particular bar or reinforcement. A distance between the attachment locations of each shutter 201a, 201b is less than a full length of each shutter 201a, 201b, so that when shutter 201a is in its extended configuration it contacts structure 218b and cannot be completely unrolled. This is the case for each pair of adjacent shutters within a display panel 200. The display array of display panel 200 may consist of many shutters 201 and many structures 218, each structure 218 (except those at the far proximal or distal ends of the shutter array) positioned to function as both an extension structure and a retraction structure.

In a variation to the embodiment shown in FIG. 5, each of the shutters 201 can be welded to the dielectric layer 104 which forces each shutter 201 to be in direct physical contact with the dielectric 104 at the point at or adjacent the attached proximal end of each shutter 201, respectively. In other variations, only proximal bars 113 or only distal bars 111 can be included for each shutter, and such bars can be one for one shutter, or one across two or more shutters in a row or column as discussed above.

Figure 3D:
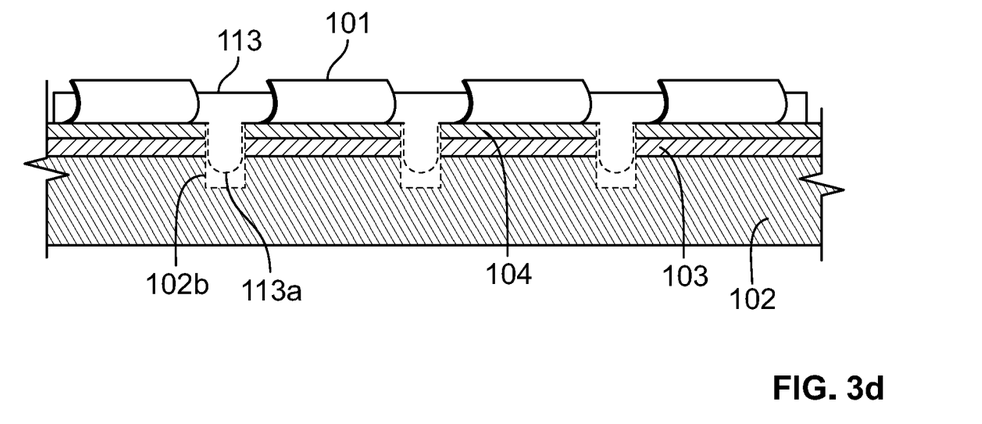
FIG. 3d is a cross-sectional view of the shutter system shown in FIG. 3a, taken along line a-a.
Figure 6A:
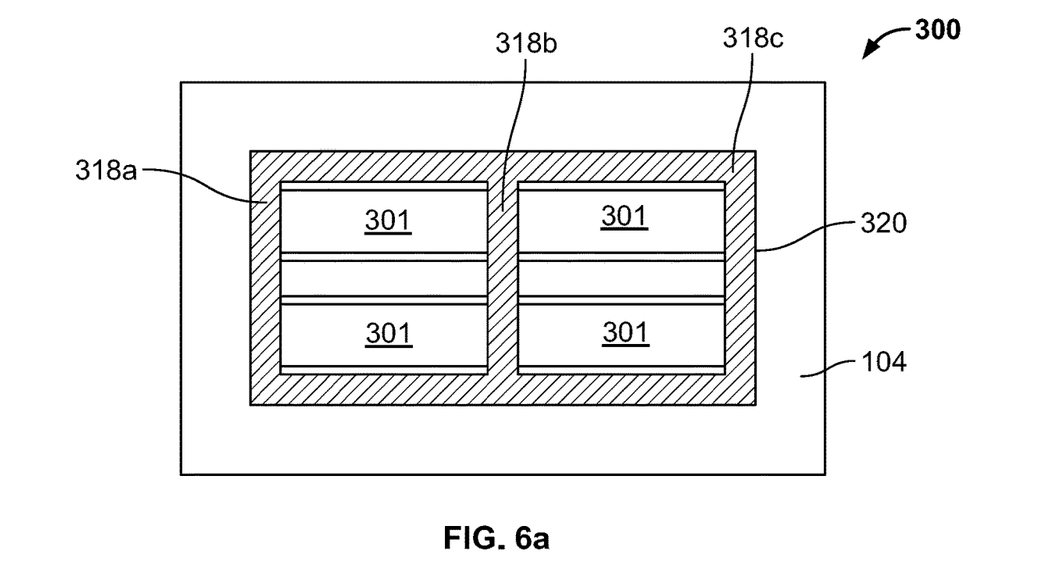
FIGS. 6a and 6b are top views of a display panel having a shutter array and incorporating another example of a retraction and extension implementation in accordance with the present invention.
Figure 6B:
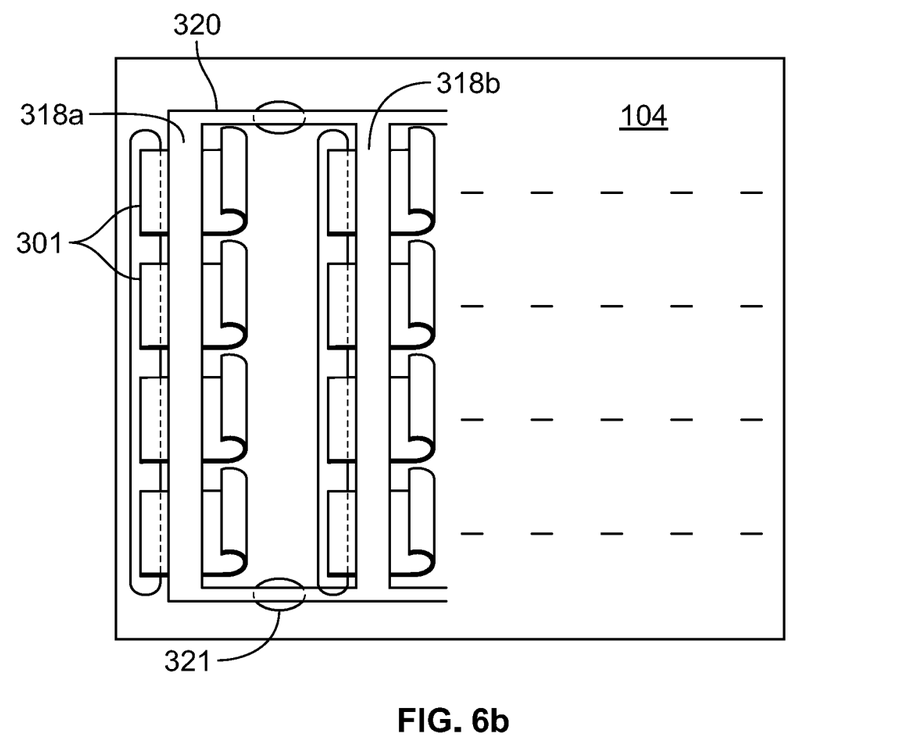

In another view, a display panel 300 can include a plurality of shutters 301 each with extension and retraction bars mounted on a frame. As an example, FIG. 6a depicts a substrate 102 with four attached shutters 301 in a two-by-two array, where the shutters roll out horizontally from left to right in the depiction. Superimposed over these shutters is a frame 320 which includes and provides the extension and retraction structures 318a, 318b, and 318c for each shutter 301. Frame 320 conveniently contains the extension and retraction structures 318 in one monolithic component that can be attached to substrate 102 or dielectric layer 104 in manners as discussed above (i.e. adhesive, welding, etc.) so that the extension and retraction bars may be mounted in one operation rather than having to mount each separately. FIG. 6b shows the structure, though with additional shutters 301 provided, in which frame 320 is attached to substrate 102 or dielectric layer 104 with an adhesive 321 or weld at separate locations. The adhesive or weld is placed at locations where it does not interfere with the functioning or appearance of the shutters. A shutter array may be made with a chosen number and size of shutters 301 and an appropriately sized frame 320 which for assembly convenience attaches some or all the bars 318 together in a conveniently mounted frame to provide extension and retraction structures 318 for each shutter 301. As mentioned above, other configurations may achieve the same results of keeping the retracted shutters 301 in intimate contact with the dielectric layer 104 and also enabling the extended shutters to retract normally. For example, the extension/retraction structures 318 could be mounted individually in proper position. This aspect could be implemented by constructing the structures as individual bars with positioning pins 113a on the bottom of the bars which could match positioning holes 102b in the substrate 102 such as depicted in FIG. 3d. The pins 113a can be held in the holes 102b by being press fit or by adhesive or the like.

As mentioned above a frame can be omitted and a plurality of shutters 101 can be provided with a number of bars 113 that is fewer than the number of shutters 101. In particular, one bar 113 can extend along the width of the substrate 102 to contact at least substantially all of the shutters 101 aligned in a respective row or column of shutters 101 disposed along that width of the substrate 102. In other words, one bar 113 can straddle multiple shutters 101 aligned in a single row or column while contacting all of the shutters 113 that it straddles.

In some instances, more than one bar can be used to traverse a row or column of shutters. In some instances, some shutters can be left uncovered by bars, particularly some shutters that may not be visible to the viewer and may be used by the manufacturer for testing purposes.

For at least some of the plurality of bars 113, the bar 113 is positioned as a reinforcement to a row of shutters 101 immediately proximal to the row or column of shutters 101 with which the bar 113 is in contact. In this way, when each shutter 101 of the immediately proximal row or column of shutters 101 is in the extended configuration, an edge at a distal end 109 of the shutter 101 opposite the proximal end 108 remains substantially parallel to the proximal end 108 of the shutter 101 as the shutter 101 transitions from the extended configuration to the retracted configuration. Each such bar 113 is spaced from the attachment location of the shutter 101 to the dielectric layer 104 by a distance that is less than a full length of the shutter 101 defined between the proximal and distal ends of the shutter 101, such that when the shutter 101 is in the extended configuration, the shutter 101 contacts the reinforcement and cannot be completely unrolled. In this way, those bars 113 between adjacent rows or columns of shutters operate like center structure 218b described above, which acts as both a bar 113 for one set of shutters 101 and as a bar 111 for another set of shutters. Accordingly, the bars between adjacent rows or columns of shutters each serve a dual purpose.

Each shutter array described herein is positioned on the substrate 102 so that the last shutter (i.e., the one nearest the perimeter in its row or column) is spaced from the edge or perimeter of the substrate 102 by a value of one half of the spacing between other shutters. In this way, when two substrates 102 are abutted together, either horizontally or vertically, the shutter spacing across the boundary between the first and second substrates is substantially identical to that of the shutter spacing across each individual substrate. It is preferable that the value of the distance between shutters on adjacent tiles is within, and preferably less than, about ten percent, and in some cases as low as one percent, of the value of spacing of shutters within a single tile, though other values are also acceptable as long as the array of shutters among a plurality of tiles appears uniform and seamless to a viewer. In addition, the drive circuitry behind each substrate is designed to make contact to the shutter array through vias in the substrate or otherwise so that the drive circuitry does not interfere with the regularity of the reflective pattern of the shutters. Thus, each individual display tile, consisting of the shutter array, reflector and drive circuitry may be abutted next to each other, creating a display of any arbitrary size.

A tile with the display panel is tilable in that identical tiles can be abutted at their peripheral edges with substantially no perceived optical interface between adjacent tiles. In other words, a display tile can be abutted at any of its peripheral edges (top, bottom, left side, right side) against identical tiles (at a peripheral edge thereof) to form a display with substantially no perceived optical interface between adjacent tiles. In this way, the overall display appears to be seamless such that it is not apparent that it is made up of individual tiles. A frameless reflective display tile in accordance with this disclosure can be used for static or video display, in which such a display includes a plurality of display panels. The presently disclosed display tiles can also include external front lighting, for example from an existing billboard.

Figure 7A:
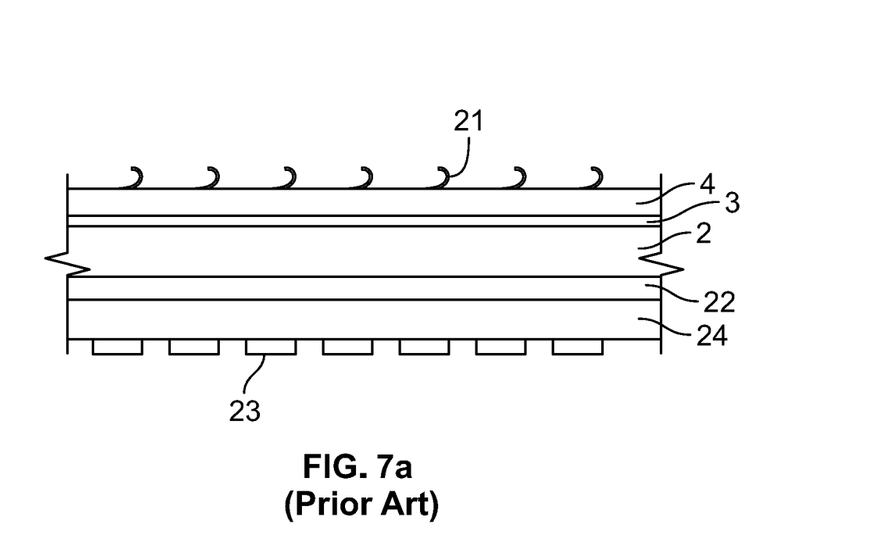
FIGS. 7a and 7b are side views of prior art display structures.

FIG. 7a depicts a shutter array display tile from the prior art. Each shutter 1 electrically functions as a capacitor with one electrode being a conductive coating on the shutter 1 and the other electrode being a conductive coating 3 on the transparent substrate 2. This conductive coating 3 is a transparent conductor patterned on the front surface of substrate 2 so that each shutter 1 may be individually electrically addressed. The dielectric layer 4 is a transparent dielectric, i.e. a thin transparent polymer film that has typically been laminated to the transparent substrate 2. This film is typically PET or another polymer which has a dielectric constant of about 3.0 as do many polymers. With this value of dielectric constant, it is important for its thickness to be about 12 microns or less so that the operating voltage to extend the shutter is not too high.

Figure 7B:
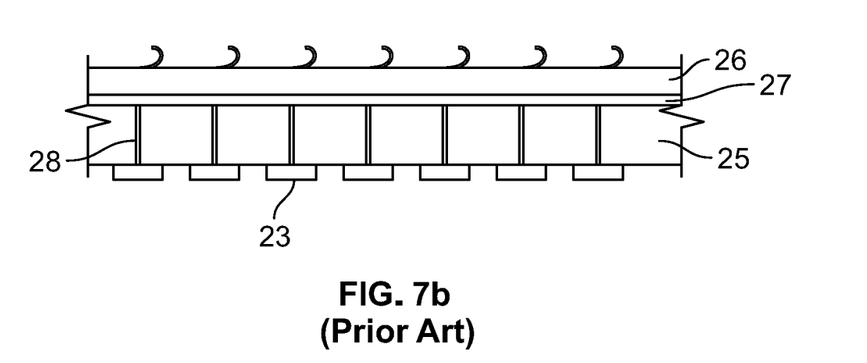

The transparent substrate 2 is backed by a reflective medium 22 and behind that is the drive electronics 23 typically mounted on a separate printed circuit board (PCB) 24. The drive electronics PCB 24 may mount on the side of the substrate rather than behind it to facilitate transmissivity of the display. However, in that case the display is not tilable. When ambient light impinges on the display it must pass through the dielectric coating, the transparent conductive coating and the transparent substrate before it can reflect off the reflective medium. Each of the transparent layers provide a certain amount of attenuation of the impingent light and then again of the light reflected off of reflective medium 22 and each has a certain amount of front surface and rear surface reflections of its own. These phenomena have a deleterious impact on the reflective display significantly reducing its contrast. The '731 Application improves on this problem by describing a display tile that uses an opaque substrate 25 and an opaque reflector 26 in front of the substrate 25 as depicted in FIG. 7b. This new arrangement eliminates the need for the transparent substrate, the laminated transparent dielectric film and the transparent conductor which must be deposited on the transparent substrate in a separate process step. The transparent conductor may be essentially replaced by standard conductive traces 27 on the PCB 24 and the transparent dielectric film may be essentially replaced by standard white or another colored or a multicolored highly diffuse reflective solder mask 26 over the conductive traces on the PCB. The multiple colors may be patterned to correlate with the shutters to create a full color display. The transparent substrate may be essentially replaced by the same PCB 24 that holds the drive electronics 23. The drive electronics 23 may drive the shutters by means of standard conductive vias 28 through the PCB. The vias connect the electronic drivers to the conductive traces on the PCB. This thereby eliminates the unwanted light attenuations and reflections of the prior art while simplifying the manufacturing process and reducing the amount of substrates to one.

Drive electronics 23 are configured as a passive x-y multiplexer of the shutters. The simplest and most efficacious way to drive a shutter array so that individual shutters can be chosen to be extended or retracted is through a multiplexing scheme commonly referred to as passive or x-y multiplexing. The scheme is implemented by constructing the conductive layer on the substrate as a set of parallel rows of electrodes in the X-direction (horizontal), rows and a conductive layer on the polymer shutters as a set of parallel columns of electrodes in the Y-direction (vertical), columns. The functionality of the rows and columns may be reversed. That is, reference herein to a "row" can apply equivalently to a "column" among the matrix of shutters depending on the direction in which the shutters are configured to roll out. The visual projection of an X-electrode and Y-electrode corresponds to an individual shutter. The combination of X- and Y-voltages at that site excites the shutter whereas the individual X- or Y-voltages everywhere else does not excite the other shutters. In other embodiments, the drive electronics can be configured for direct drive of the shutters where each shutter has its own driver or as an active matrix multiplexer of the shutters.

Figure 8:
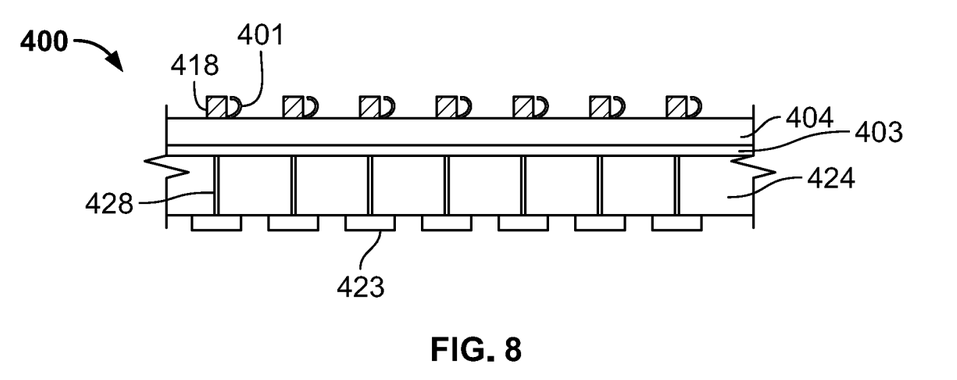
FIG. 8 is a side view of a display structure in accordance with another embodiment of the present invention.

The present invention significantly improves upon the '731 Application through the addition of the extension/retraction implementations (e.g. bars 111, 113) which make the shutters readily multiplexable and reliable. FIG. 8 depicts an implementation 400 of the present invention using an example of an extension/retraction bar. A PCB 424, which is effectively a combination of the substrate and the conductive layer disclosed in the embodiments above, is coated with the conductive layer 403 which is patterned to form electrodes of each capacitor corresponding to each shutter. Conductive vias 428 through the PCB 424 make electrical contact between the drive circuitry 423 mounted on the rear of the PCB substrate 424 and the conductive contacts of the conductive layer 403 patterned on the front surface of the substrate 424. The dielectric/reflector 404, which is diffuse reflective and opaque and in this example may be a solder mask, is coated directly on the front surface of the PCB substrate 424 which includes the conductive layer 403 on its surface. The dielectric/reflector 404 can be only a single color, or can be at least two different colors. The multiple colors may be patterned to correlate with the shutters to create a full color display. The conductor pattern 403 and solder mask 404 are routine and commonplace coatings on PCBs. There are no other intervening materials between the PCB substrate, the conductive pattern, and the solder mask. A shutter array including a plurality of shutters 401 is disposed on the solder mask 404. Each shutter 401 in the array has a conductive coating which forms the opposing electrode of each shutter capacitor. A plurality of extension/retraction structural implementations 418 is affixed to the substrate structure.

Figure 9:
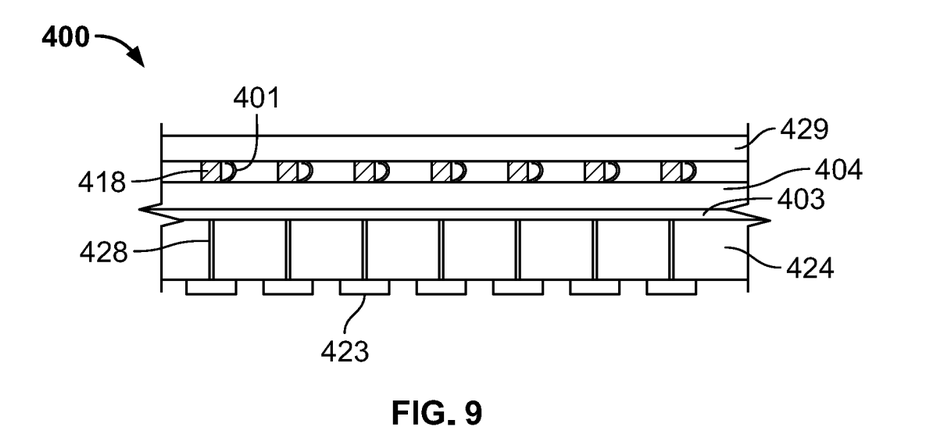
FIG. 9 is a side view of a display structure in accordance with another embodiment of the present invention.

As shown in FIG. 9, a clear cover 429 made of glass or plastic or any primarily transparent material may be added to the display panel 400 for protection of the shutters and reflecting surface and ease of installation. The cover 429 may be coated with an antireflective coating on one or both sides so as not to degrade the legibility of the display panel. There are several ways that the cover 429 can be sealed to the display panel 400. One convenient way is to extend the heights of the extension/retraction bars 418 so that they extend beyond the height of the shutters 401, even in their coiled form, and then using the bars 401 as functional spacers in attaching the cover 429 to the display tile 400. Another way is simply to provide an elevated "picture frame" around the periphery of PCB 424 upon which cover glass 429 is mounted. In either case, the cover glass 429 is sealed to its mounting so as to protect the display panel 400 from the elements. The cover glass 429 is not considered to be a coating on the substrate as are the conductive layer 403 and reflective surface 404 since they are in intimate and direct contact with each other and the cover glass 429 is not. The cover glass 429 maintains an airgap between it and the substrate to allow the shutters 401 to extend and retract freely. An external front lighting can also be added to the display panel 400, or to a static or video display that includes a plurality of the display panels 400

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A display panel comprising:
a substrate having a front surface with a length and a width, and a conductive layer on a portion of the front surface of the substrate, wherein the conductive layer is a conductor patterned on the front surface of the substrate;
a dielectric layer disposed on the conductive layer, wherein the dielectric layer is a diffuse reflecting opaque dielectric; and
a plurality of electrostatic shutters, each shutter of the plurality of electrostatic shutters having a proximal end attached to the dielectric layer such that a portion of the respective shutter is in direct physical contact with the dielectric layer at a point at or adjacent the respective attached proximal end, wherein each shutter of the plurality of electrostatic shutters is configured to transition between an extended configuration in which the respective shutter is extended and disposed on the dielectric layer to cover a portion of the dielectric layer and a retracted configuration in which the respective shutter is rolled-up to expose the portion of the dielectric layer,
whereby, when a voltage is applied between the conductive layer and each electrostatic shutter of the plurality of electrostatic shutters, a potential difference between the conductive layer and the respective electrostatic shutter causes the respective shutter to transition from the retracted configuration to the extended configuration; and
drive electronics on a side of the substrate opposite the front surface.

2. The display panel of claim 1, wherein at least one shutter of the plurality of electrostatic shutters includes an ink coating and a conductive coating.

3. The display panel of claim 1, wherein the substrate and the conductive layer comprise a printed circuit board.

4. The display panel of claim 3, wherein the printed circuit board defines vias therethrough through which the drive electronics connect with the patterned conductor.

5. The display panel of claim 3, wherein the opaque dielectric is a solder mask.

6. The display panel of claim 1, wherein the opaque dielectric is at least one color.

7. A static or video display comprising:
a plurality of the display panels each according to claim 1 and arranged to form the display,
wherein in each of the display panels, the plurality of shutters and the drive electronics are configured so that the display panels are abutted at adjacent peripheral edges to form the display with substantially no perceived optical interface between adjacent tiles, wherein the spacing among the shutters of a single display panel is consistent and is substantially identical to the spacing among shutters across a boundary between abutted display panels.

8. The static or video display of claim 7, further comprising an attached cover.

9. The display panel of claim 1, wherein the drive electronics are configured for direct drive or multiplex drive of the shutters.

10. The display panel of claim 1, wherein each of the shutters is attached to the dielectric layer with an adhesive and one of a plurality of bars extending along the width of the substrate, each bar of the plurality of bars in contact with at least substantially all of the shutters aligned in a respective row or column of shutters disposed along the width of the substrate such that substantially all of the shutters are in direct physical contact with the dielectric at respective points adjacent the attached proximal end of each shutter.

11. The display panel of claim 10, wherein for at least some of the plurality of bars, the bar is positioned as a reinforcement to a row or column of shutters immediately proximal to the row or column of shutters with which the bar is in contact, such that when each shutter of the immediately proximal row or column of shutters is in the extended configuration, an edge at a distal end of the shutter opposite the proximal end remains substantially parallel to the proximal end of the shutter as the shutter transitions from the extended configuration to the retracted configuration.

12. The display panel of claim 1, wherein each of the shutters is welded to the dielectric layer which forces each shutter to be in direct physical contact with the dielectric layer at the point at or adjacent the attached proximal end of each shutter, respectively.

13. The display panel of claim 1, wherein each shutter of the plurality of electrostatic shutters includes a reinforcement at the distal end of the shutter itself that is relatively stiffer than a remainder of the shutter, such that when the shutter is in the retracted configuration, the reinforcement at the distal end of the shutter is rolled-up with the shutter, and when the shutter is in the extended configuration, the reinforcement remains substantially parallel to the attachment location of the shutter to the dielectric layer as the shutter transitions from the extended configuration to the retracted configuration.

14. The static or video display of claim 8, wherein the cover includes an antireflective coating.

15. The static or video display of claim 7, further comprising external front lighting.

16. A shutter system comprising:
a substrate having a front surface with a length and a width, and a conductive layer on a portion of the front surface of the substrate;
a dielectric layer disposed on the conductive layer;
an electrostatic shutter having a proximal end attached to the dielectric layer at an attachment location along the width of the front surface of the substrate, wherein the shutter is configured to transition between an extended configuration in which the shutter is extended and disposed on the dielectric layer to cover a portion of the dielectric layer and a retracted configuration in which the shutter is rolled-up to expose the portion of the dielectric layer; and
wherein the shutter includes a reinforcement at a distal end of the shutter itself and the reinforcement is relatively stiffer than a remainder of the shutter, such that when the shutter is in the retracted configuration, the reinforcement at the distal end of the shutter is rolled-up with the shutter, and when the shutter is in the extended configuration, an edge at the distal end of the shutter opposite the proximal end remains substantially parallel to the proximal end of the shutter as the shutter transitions from the extended configuration to the retracted configuration, whereby, when a voltage is applied between the conductive layer and the electrostatic shutter, a potential difference between the conductive layer and the electrostatic shutter causes the shutter to transition from the retracted configuration to the extended configuration.

17. The shutter system of claim 16, wherein the shutter is attached to the dielectric layer with an adhesive, and a bar forces a portion of the shutter to be in direct physical contact with the dielectric at a point at or adjacent the attached proximal end.

18. The shutter system of claim 16, wherein the shutter is welded to the dielectric layer which forces the shutter to be in direct physical contact with the dielectric layer at a point at or adjacent the attached proximal end.

19. The shutter system of claim 16, wherein the shutter includes an ink coating and a conductive coating.

20. The shutter system of claim 16, wherein the shutter is comprised of a polymer.

21. The shutter system of claim 16, wherein the shutter is comprised of an organic material.

22. The shutter system of claim 16, wherein the shutter is comprised of an inorganic material.

23. A display panel comprising:
a substrate having a front surface with a length and a width, and a conductive layer on a portion of the front surface of the substrate, wherein the conductive layer is a conductor patterned on the front surface of the substrate;
a dielectric layer disposed on the conductive layer, wherein the dielectric layer is a diffuse reflecting opaque dielectric; and
a plurality of electrostatic shutters, each shutter of the plurality of electrostatic shutters having a proximal end attached to the dielectric layer at an attachment location along the width of the front surface of the substrate, wherein each shutter of the plurality of electrostatic shutters is configured to transition between an extended configuration in which the respective shutter is extended and disposed on the dielectric layer to cover a portion of the dielectric layer and a retracted configuration in which the respective shutter is rolled-up to expose the portion of the dielectric layer;
each shutter of the plurality of electrostatic shutters including a reinforcement configured such that when the respective shutter is in the extended configuration, an edge at a distal end of the respective shutter opposite the proximal end remains substantially parallel to the proximal end of the respective shutter as the respective shutter transitions from the extended configuration to the retracted configuration, whereby, when a voltage is applied between the conductive layer and each electrostatic shutter of the plurality of electrostatic shutters, a potential difference between the conductive layer and the respective electrostatic shutter causes the respective shutter to transition from the retracted configuration to the extended configuration; and drive electronics on a side of the substrate opposite the front surface.

24. The display panel of claim 23, wherein the substrate and the conductive layer comprise a printed circuit board.

25. The display panel of claim 24, wherein the printed circuit board defines vias therethrough through which the drive electronics connect with the patterned conductor.

26. The display panel of claim 24, wherein the opaque dielectric is a solder mask.

27. The display panel of claim 23, wherein the opaque dielectric is at least one color.

28. A static or video display comprising:
a plurality of the display panels each according to claim 23 and arranged to form the display,
wherein in each of the display panels, the plurality of shutters and the drive electronics are configured so that the display panels are abutted at adjacent peripheral edges to form the display with substantially no perceived optical interface between adjacent tiles,
wherein the spacing among the shutters of a single display panel is consistent and is substantially identical to the spacing among shutters across a boundary between abutted display panels.

29. The static or video display of claim 28, further comprising an attached cover.

30. The display panel of claim 23, wherein the drive electronics are configured for direct drive or multiplex drive of the shutters.

31. The display panel of claim 23, wherein the plurality of shutters are arranged in a plurality of shutter rows or columns each disposed along the width of the substrate, and wherein the reinforcement is a plurality of bars each extending along the width of the substrate, each bar of the plurality of bars attached to the dielectric layer and/or the substrate and spaced from the attachment locations of at least substantially all of the shutters aligned in one of the shutter rows or columns by a distance that is less than a full length of the shutters defined between the proximal and distal ends of the shutters, such that when the shutters are in the extended configuration, the shutters contact the respective bar and cannot be completely unrolled.

32. The display panel of claim 31, wherein for at least some of the plurality of bars, the bar is positioned with respect to a row or column of shutters immediately distal to the row or column of shutters with which the bar is associated, such that each shutter of the immediately distal row of shutters is in direct physical contact with the dielectric layer at a point adjacent the attached proximal end.

33. The display panel of claim 23, wherein each shutter of the plurality of electrostatic shutters includes the reinforcement at the distal end of the shutter itself and the reinforcement is relatively stiffer than a remainder of the shutter, such that when the shutter is in the extended configuration, the reinforcement remains substantially parallel to the attachment location of the shutter to the dielectric layer as the shutter transitions from the extended configuration to the retracted configuration.

34. The display panel of claim 23, wherein each shutter of the plurality of electrostatic shutters is welded to the dielectric layer which forces the respective shutter to be in direct physical contact with the dielectric layer at the point at or adjacent the attached proximal end of the respective shutter.

35. The display panel of claim 23, wherein at least one shutter of the plurality of electrostatic shutters includes an ink coating and a conductive coating.

36. The static or video display of claim 29, wherein the cover includes an antireflective coating.

37. The static or video display of claim 28, further comprising external front lighting.

38. A display panel comprising:
a printed circuit board having a front surface with a length and a width, and a conductive layer on a portion of the front surface of the printed circuit board, wherein the conductive layer is a conductor patterned on the front surface of the printed circuit board;
a solder mask disposed on the conductive layer, wherein the solder mask is a diffuse reflecting opaque dielectric; and
a plurality of electrostatic shutters, each shutter of the plurality of electrostatic shutters having a proximal end attached to the solder mask at an attachment location along the width of the front surface of the printed circuit board, wherein each shutter of the plurality of electrostatic shutters is configured to transition between an extended configuration in which the respective shutter is extended and disposed on the solder mask to cover a portion of the solder mask and a retracted configuration in which the respective shutter is rolled-up to expose the portion of the solder mask;
whereby, when a voltage is applied between the conductive layer and each electrostatic shutter of the plurality of electrostatic shutters, a potential difference between the conductive layer and the respective electrostatic shutter causes the respective shutter to transition from the retracted configuration to the extended configuration; and
drive electronics on a side of the printed circuit board opposite the front surface.

39. The display panel of claim 38, wherein at least one shutter of the plurality of electrostatic shutters includes an ink coating and a conductive coating.

40. The display panel of claim 38, wherein the printed circuit board defines vias therethrough through which the drive electronics connect with the patterned conductor.

41. The display panel of claim 38, wherein the opaque dielectric is at least one color.

42. A static or video display comprising:
a plurality of the display panels each according to claim 38 and arranged to form the display,
wherein in each of the display panels, the plurality of shutters and the drive electronics are configured so that the display panels are abutted at adjacent peripheral edges to form the display with substantially no perceived optical interface between adjacent tiles,
wherein the spacing among the shutters of a single display panel is consistent and is substantially identical to the spacing among shutters across a boundary between abutted display panels.

43. The static or video display of claim 42, further comprising an attached cover.

44. The static or video display of claim 43, wherein the cover includes an antireflective coating.

45. The static or video display of claim 42, further comprising external front lighting.

46. The display panel of claim 38, wherein the drive electronics are configured for direct drive or multiplex drive of the shutters.

47. The display panel of claim 38, wherein each of the shutters is attached to the solder mask with an adhesive and one of a plurality of bars extending along the width of the printed circuit board, each bar of the plurality of bars in contact with at least substantially all of the shutters aligned in a respective row or column of shutters disposed along the width of the printed circuit board such that substantially all of the shutters are in direct physical contact with the dielectric at respective points adjacent the attached proximal end of each shutter.

48. The display panel of claim 47, wherein for at least some of the plurality of bars, the bar is positioned as a reinforcement to a row or column of shutters immediately proximal to the row or column of shutters with which the bar is in contact, such that when each shutter of the immediately proximal row or column of shutters is in the extended configuration, an edge at a distal end of the shutter opposite the proximal end remains substantially parallel to the proximal end of the shutter as the shutter transitions from the extended configuration to the retracted configuration.

49. The display panel of claim 38, wherein each of the shutters is welded to the solder mask which forces each shutter to be in direct physical contact with the solder mask at the point at or adjacent the attached proximal end of each shutter, respectively.

50. The display panel of claim 38, wherein each shutter of the plurality of electrostatic shutters includes a reinforcement at the distal end of the shutter itself that is relatively stiffer than a remainder of the shutter, such that when the shutter is in the retracted configuration, the reinforcement at the distal end of the shutter is rolled-up with the shutter, and when the shutter is in the extended configuration, the reinforcement remains substantially parallel to the attachment location of the shutter to the solder mask as the shutter transitions from the extended configuration to the retracted configuration.

\* \* \* \* \*